(12) United States Patent
Hoshino

(10) Patent No.: US 11,645,448 B2
(45) Date of Patent: May 9, 2023

(54) DOCUMENT ANALYSIS APPARATUS, DOCUMENT ANALYSIS METHOD, AND COMPUTER-READABLE RECORDING MEDIUM

(71) Applicant: NEC Corporation, Tokyo (JP)

(72) Inventor: Ayako Hoshino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/441,338

(22) PCT Filed: Mar. 29, 2019

(86) PCT No.: PCT/JP2019/014200
§ 371 (c)(1),
(2) Date: Sep. 21, 2021

(87) PCT Pub. No.: WO2020/202324
PCT Pub. Date: Oct. 8, 2020

(65) Prior Publication Data
US 2022/0164522 A1    May 26, 2022

(51) Int. Cl.
*G06F 40/137* (2020.01)
*G06F 40/166* (2020.01)

(52) U.S. Cl.
CPC .......... *G06F 40/137* (2020.01); *G06F 40/166* (2020.01)

(58) Field of Classification Search
CPC ............................ G06F 40/137; G06F 40/166
See application file for complete search history.

(56) References Cited

U.S. PATENT DOCUMENTS

| 10,621,390 B1* | 4/2020 | Winston ................ G06F 40/268 |
| 2015/0026556 A1* | 1/2015 | Stadermann .......... G06F 40/183 715/227 |
| 2015/0186352 A1* | 7/2015 | Greenwood ............ G06F 40/14 715/217 |
| 2019/0294663 A1* | 9/2019 | Yu ......................... G06F 40/177 |

FOREIGN PATENT DOCUMENTS

| JP | S62-229638 A | 10/1987 |
| JP | H04-175966 A | 6/1992 |
| JP | 2007-286861 A | 11/2007 |

OTHER PUBLICATIONS

English translation of Written opinion for PCT Application No. PCT/JP2019/014200, dated Jun. 11, 2019.

(Continued)

*Primary Examiner* — Thu V Huynh

(57) ABSTRACT

A document analysis apparatus 10 includes: a candidate generation unit 11 that, for each line included in a document that is a target of structural analysis, specifies another line in a parallel relationship with the line by performing extraction of a marker indicating a hierarchy, and generates a candidate for a hierarchical structure of the document that is the target based on the result of the specification of each line; and a candidate evaluation unit 12 that, if two or more candidates have been generated, performs evaluation on each candidate for the hierarchical structure, and selects one candidate for the hierarchical structure as the hierarchical structure of the document that is the target based on the evaluation result.

9 Claims, 9 Drawing Sheets

(56) References Cited

OTHER PUBLICATIONS

International Search Report for PCT Application No. PCT/JP20XX/XXX, dated Jun. 11, 2019.
T. Nanno et al., "Structuring Web pages based on repetition of elements", Information Processing Society of Japan (IPSJ) SIG technical reports, vo.2003, No. 23, Mar. 6, 2003, pp. 185-192.
Tateishi Yuka, et al., "Logical Structure Extraction Using Stochastic Grammar", The transactions of the Institute of Electronics, Information and Communication Engineers, vol. J79-D2, No. 5, May 25, 1996, pp. 687-697.

\* cited by examiner

Fig.3

REGULAR EXPRESSION USED TO SET LINE BREAKS

```
¥s¥s

<[^>]*>

(IF ?<=)¥s (OTHER THAN ?<=)¥s

MARKER

| SYMBOL | CLASS |
|---|---|
| 1、2、3、 ⋯ | FULL-WIDTH CHARACTERS |
| 1、2、3、 ⋯ | HALF-WIDTH CHARACTERS |
| A、B、C、 ⋯ | FULL-WIDTH ENGLISH LARGE CHARACTERS |
| A、B、C、 ⋯ | HALF-WIDTH ENGLISH LARGE CHARACTERS |
| a、b、c、 ⋯ | FULL-WIDTH ENGLISH SMALL CHARACTERS |
| a、b、c、 ⋯ | HALF-WIDTH ENGLISH SMALL CHARACTERS |
| （ | ⋯ FULL-WIDTH PARENTHESES |
| 〔 | ⋯ FULL-WIDTH BRACKET |
| ■ | ⋯ FULL-WIDTH SQUARE |

Fig.5

DOCUMENT A

```
L1: (1) ··· DESU.
L2: ■··· MASU!
L3: (2) ··· DESU!
L4: ■···MASU.
L5: (3) ···MASU.
```

CANDIDATE 1

```
L1: LEVEL 1 (1) ··· DESU.
L2: LEVEL 2 ■··· MASU!
L3: LEVEL 1 (2) ··· DESU!
L4: LEVEL 2 ■···MASU.
L5: LEVEL 1 (3) ···MASU.
```

CANDIDATE 5

```
L1: LEVEL 1 (1) ··· DESU.
L2: LEVEL 2 ■··· MASU!
L3: LEVEL 1 (2) ··· DESU!
L4: LEVEL 1 ■···MASU.
L5: LEVEL 1 (3) ···MASU.
```

CANDIDATE 2

```
L1: LEVEL 1 (1) ··· DESU.
L2: LEVEL 2 ■··· MASU!
L3: LEVEL 1 (2) ··· DESU!
L4: LEVEL 2 ■···MASU.
L5: LEVEL 2 (3) ···MASU.
```

CANDIDATE 6

```
L1: LEVEL 1 (1) ··· DESU.
L2: LEVEL 2 ■··· MASU!
L3: LEVEL 1 (2) ··· DESU!
L4: LEVEL 1 ■···MASU.
L5: LEVEL 2 (3) ···MASU.
```

CANDIDATE 3

```
L1: LEVEL 1 (1) ··· DESU.
L2: LEVEL 2 ■··· MASU!
L3: LEVEL 2 (2) ··· DESU!
L4: LEVEL 2 ■···MASU.
L5: LEVEL 1 (3) ···MASU.
```

CANDIDATE 7

```
L1: LEVEL 1 (1) ··· DESU.
L2: LEVEL 2 ■··· MASU!
L3: LEVEL 2 (2) ··· DESU!
L4: LEVEL 1 ■···MASU.
L5: LEVEL 1 (3) ···MASU.
```

CANDIDATE 4

```
L1: LEVEL 1 (1) ··· DESU.
L2: LEVEL 2 ■··· MASU!
L3: LEVEL 2 (2) ··· DESU!
L4: LEVEL 2 ■···MASU.
L5: LEVEL 2 (3) ···MASU.
```

CANDIDATE 8

```
L1: LEVEL 1 (1) ··· DESU.
L2: LEVEL 2 ■··· MASU!
L3: LEVEL 2 (2) ··· DESU!
L4: LEVEL 1 ■···MASU.
L5: LEVEL 2 (3) ···MASU.
```

Fig.7A (a) INPUT DOCUMENT

```
Personnel Service Division * See below for details
(Injury and illness allowance, maternity allowance) Valuable item email Symbol 20
PostalCode ★★-▲▲▲ To the person in charge of health insurance benefits Symbol
other than symbol 20 PostalCode ★★-▲▲● (Affiliation company name (seconded company
name is seconded company name)) To the person in charge Mail PostalCode ■■-▲▲▲
○○ Ward, Kawasaki City, Kanagawa Prefecture □□□ Symbol 20 TO the person in charge
of health insurance benefits (22-12220) Symbol other than symbol 20 (Affiliation
company name (seconded company name is seconded company name)) To the person in charge
(Notifications other than injury and illness allowance and maternity allowance)
Valuable item email PostalCode ▲▲-●●▲ To the person in charge of health insurance
Mail PostalCode 211-8601 Kawasaki City, Kanagawa Prefecture ○○ Ward □□□ To society
insurance G
```

Fig.7B (b) HIERARCHICAL STRUCTURE (Injury and illness allowance, maternity allowance)

[Valuable item] email

[Symbol] 20 PostalCode ★★-▲▲▲ To the person in charge of health insurance benefits

[Symbol] other than symbol20 PostalCode ★★-▲▲● (Affiliation company name (seconded company name is seconded company name)) To the person in charge

[Mail] PostalCode ■■-▲▲▲ ○○ Ward, Kawasaki City, Kanagawa Prefecture □□□

[Symbol] 20 To the person in charge of health insurance benefits (22-12220)

[Symbol] other than symbol20 (Affiliation company name (seconded company name is seconded company name)) To the person in charge (Notifications other than injury and illness allowance and maternity allowance)

[Valuable item] email

[PostalCode] ▲▲-●●▲ To the person in charge of health insurance

[Mail]

[PostalCode] 211-8601 Kawasaki City, Kanagawa Prefecture ○○ Ward □□□ To society insurance G

DOCUMENT ANALYSIS APPARATUS, DOCUMENT ANALYSIS METHOD, AND COMPUTER-READABLE RECORDING MEDIUM

This application is a National Stage Entry of PCT/JP2019/014200 filed on Mar. 29, 2019, the contents of all of which are incorporated herein by reference, in their entirety.

TECHNICAL FIELD

The present invention relates to a document analysis apparatus and a document analysis method for analyzing the structure of a document, and further relates to a computer-readable recording medium on which is recorded a program for realizing the document analysis apparatus and the document analysis method.

BACKGROUND ART

In recent years, it has become possible for anyone to easily transmit information due to the development of computer communication using the Internet. For this reason, a large number of documents have been accumulated as information on the Internet. However, documents that are merely accumulated do not produce any informational value, and therefore it is important to make it possible to effectively use the accumulated documents.

For this reason, for example, Non-Patent Document 1 discloses a system that enables use of documents on the Web by various applications. Specifically, the system disclosed in Non-Patent Document 1 executes segmentation of information of the same level by repeatedly detecting information in an HTML document forming a Web page. As a result, structuring of the Web page is achieved, and it is possible to follow a document on a Web page in a hierarchical manner, and therefore it is possible to use this document in efficient browsing, information searching, and the like. That is, effective use of the document is achieved.

Patent Document 1 also discloses a system for extracting a document structure from an HTML document. Specifically, the system disclosed in Patent Document 1 extracts the document structure of the HTML document by converting the HTML document serving as the target into a common format, specifying portions in which the headings and similar portions consecutively appear as one item, and performing association of the specified items. If the document for which this kind of document structure has been extracted is used, the accuracy of document searching in search processing increases, and therefore effective use of the information is achieved.

LIST OF RELATED ART DOCUMENTS

Patent Document

Patent Document 1: Japanese Patent Laid-Open Publication No. 2007-286861

Non-Patent Document

Non-Patent Document 1: T. Nanno, S. Saito, M. Okumura, "Structuring Web pages based on repetition of elements", Information Processing Society of Japan, 2003

SUMMARY OF INVENTION

Problems to be Solved by the Invention

However, the system disclosed in Non-Patent Document 1 and the system disclosed in Patent Document 1 use only HTML documents, or that is, hierarchical semi-structured documents. For this reason, these systems have been problematic in that it is not possible to handle a case in which documents that have no hierarchy are accumulated as the information.

An example of an object of the present invention is to solve the above-described problem and provide a document analysis apparatus, a document analysis method, and a computer-readable recording medium according to which it is possible to extract a hierarchical structure even for a document that has no hierarchy.

Means for Solving the Problems

In order to achieve the above-described object, a document analysis apparatus according to an aspect of the present invention includes:

a candidate generation unit configured to, for each line included in a document that is a target of structural analysis, specify another line in a parallel relationship with the line by extracting a marker indicating a hierarchy, and generate a candidate for a hierarchical structure of the document that is the target based on the result of specification for each line; and a candidate evaluation unit configured to, if two or more candidates have been generated, perform evaluation on each candidate for the hierarchical structure, and select one candidate for the hierarchical structure as the hierarchical structure of the document that is the target, based on the evaluation result.

Also, in order to achieve the above-described object, a document analysis method according to an aspect of the present invention includes:

(a) a step of specifying, for each line included in a document that is a target of structural analysis, another line in a parallel relationship with the line by extracting a marker indicating a hierarchy, and generating a candidate for a hierarchical structure of the document that is the target based on the result of specification for each line; and (b) a step of performing evaluation on each candidate for the hierarchical structure if two or more candidates have been generated, and selecting one candidate for the hierarchical structure as the hierarchical structure of the document that is the target, based on the evaluation result.

Furthermore, in order to achieve the above-described object, a computer-readable recording medium according to an aspect of the present invention has recorded thereon a program including a command for causing a computer to execute:

(a) a step of specifying, for each line included in a document that is a target of structural analysis, another line in a parallel relationship with the line by extracting a marker indicating a hierarchy, and generating a candidate for a hierarchical structure of the document that is the target based on the result of specification for each line; and (b) a step of performing evaluation on each candidate for the hierarchical structure if two or more candidates have been generated, and selecting one candidate for the hierarchical structure as the hierarchical structure of the document that is the target based on the evaluation result.

Advantageous Effects of the Invention

As described above, according to the present invention, it is possible to extract a hierarchical structure even if a document has no hierarchy.

BRIEF DESCRIPTION OF THE DRAWINGS

FIG. 3 is a diagram showing an example of a rule to be used in setting of a line break performed by a candidate generation unit in an example embodiment of the present invention.

FIG. 4 is a diagram showing an example of markers extracted by a candidate generation unit in an example embodiment of the present invention.

FIG. 5 is a diagram showing an example of candidates for a hierarchical structure generated by a candidate generation unit in an example embodiment of the present invention.

FIG. 7A is a diagram showing an example of a document serving as a target, and FIG. 7B is a diagram showing an example of a hierarchical structure obtained from the document shown in FIG. 7A.

EXAMPLE EMBODIMENTS

Example Embodiment

Hereinafter, a document analysis apparatus, a document analysis method, and a program according to an example embodiment of the present invention will be described with reference to FIGS. 1 to 8.

[Apparatus Configuration]

Figure 1:
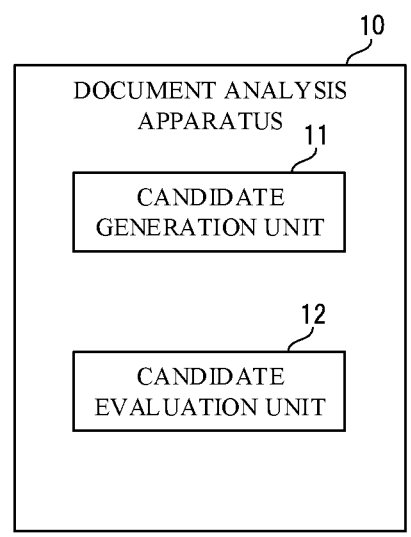
FIG. 1 is a block diagram showing an overall configuration of a document analysis apparatus according to an example embodiment of the present invention.

First, an overall configuration of a document analysis apparatus according to the present example embodiment will be described with reference to FIG. 1. FIG. 1 is a block diagram showing an overall configuration of a document analysis apparatus according to an example embodiment of the present invention.

The document analysis apparatus 10 according to the present example embodiment, which is shown in FIG. 1, is an apparatus for analyzing the structure of a document. As shown in FIG. 1, the document analysis apparatus 10 according to the present example embodiment includes a candidate generation unit 11 and a candidate evaluation unit 12.

The candidate generation unit 11 performs extraction of a marker indicating a hierarchy for each line included in a document that is a target of structural analysis (hereinafter written as a "target document"), and thereby specifies other lines that are in a parallel relationship to that line. Also, the candidate generation unit 11 generates a candidate for the hierarchical structure of the target document based on the result of the specification of each line.

If two or more candidates have been generated, the candidate evaluation unit 12 performs evaluation on each candidate for the hierarchical structure of the target document. Then, the candidate evaluation unit 12 selects one candidate for the hierarchical structure as the hierarchical structure of the target document based on the evaluation result.

In this manner, the document analysis apparatus 10 generates candidates for the hierarchical structure by extracting markers indicating the hierarchy from the document, and selects a suitable hierarchical structure from among the candidates by evaluating the candidates. For this reason, according to the document analysis apparatus 10, it is possible to extract a hierarchical structure even for a document that has no hierarchy.

Figure 2:
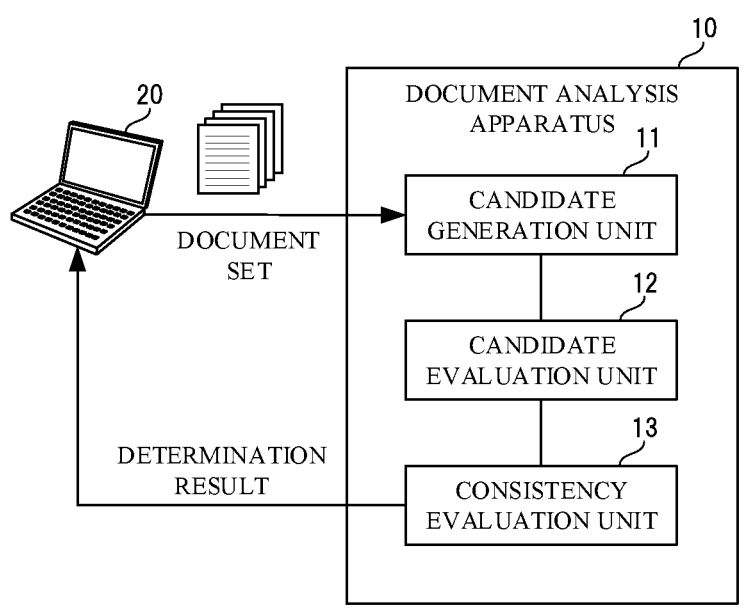
FIG. 2 is a block diagram specifically showing a configuration of a document analysis apparatus according to an example embodiment of the present invention.

Next, the configuration and the function of the document analysis apparatus 10 according to the present example embodiment will be described in further detail with reference to FIG. 2. FIG. 2 is a block diagram specifically showing a configuration of a document analysis apparatus according to an example embodiment of the present invention.

As shown in FIG. 2, with the present example embodiment, the document analysis apparatus 10 includes a consistency evaluation unit 13 in addition to the above-described candidate generation unit 11 and candidate evaluation unit 12. The details of the consistency evaluation unit 13 will be described later. Also, in the present example embodiment, the target of the analysis is not a single document, but a document set constituted by multiple documents. The document set is input from a terminal device 20 of a user.

In the present example embodiment, the candidate generation unit 11 generates candidates for the hierarchical structure for each document constituting the document set being analyzed. Also, in the present example embodiment, the candidate generation unit 11 generates multiple lines by setting line breaks in a target document according to a pre-determined rule, and can perform extraction of markers for each generated line and thereby specify other lines in a parallel relationship with that line.

Furthermore, during generation of the candidates, for each line, the candidate generation unit 11 performs extraction of a symbol included in the line as a marker, and specifies another line including a symbol that is the same as or similar to the extracted symbol as another line in a parallel relationship to that line.

Here, the function of the candidate generation unit 11 will be described specifically with reference to FIGS. 3 to 5. FIG. 3 is a diagram showing an example of a rule that is used in the setting of the line breaks performed by the candidate generation unit in an example embodiment of the present invention. FIG. 4 is a diagram showing an example of markers extracted by the candidate generation unit in an example embodiment of the present invention. FIG. 5 is a diagram showing an example of candidates for a hierarchical structure generated by the candidate generation unit in an example embodiment of the present invention.

FIG. 3 shows a regular expression that is to be used as a rule in the setting of line breaks. In the example shown in FIG. 3, the candidate generation unit 11 breaks up the lines such that the regular expression falls at the end of a line when one of the regular expressions shown in FIG. 3 is present in the document. Note that the regular expression shown in FIG. 3 is merely an example, and another regular expression may also be used.

FIG. 4 shows an example of symbols that are to be markers. As shown in FIG. 4, numbers, characters, parentheses, and the like are included in symbols herein. Also, in the example shown in FIG. 4, symbols that are in a relationship of being similar to each other are grouped into one symbol class. The symbol classes are constituted by a group of consecutive symbols, such as 1, 2, 3, . . . , A, B, C, . . . , a, b, c, . . . , and the like.

Also, the symbols that are to be markers may also be constituted by a combination of multiple symbols, such as (1), (a). Furthermore, the symbol that is to be marker may also be a word such as "mail", or a word that comes at the end of sentence, such as "desu" or "-masu". The symbol that is to be a marker may also be a symbol that is placed at the end of a sentence, such as ".", "?", or "!". In addition, if multiple symbols are grouped based on a similar-word relationship, symbols belonging to the same group may also be treated as the above-described symbol class.

For example, when a full-width "1" is extracted from a specific line as a marker and a full-width "2" is extracted from another line in a document, these symbols are included in the same symbol class, and therefore the candidate generation unit 11 determines that these lines are in a parallel relationship with each other. Also, multiple symbols that can be markers are included in the same line in some cases. In this case, according to the markers, that line is or is not in a parallel relationship with another line, is in a parallel relationship with multiple lines of different levels (to be described later), or furthermore, there is no line that is in a parallel relationship up to the previous line, and therefore multiple candidates are envisioned. The candidate generation unit 11 generates multiple candidates for the hierarchical structure while performing this kind of determination.

Here, as shown in FIG. 5, the document that is to be the target of candidate generation is assumed to be a document A. Furthermore, it is assumed that the symbol classes shown in FIG. 4 are being employed as the symbol classes. In this case, the candidate generation unit 11 first determines whether or not there is a symbol that is a marker (see FIG. 4) in the first line (L1). In the first line, "(1)", "desu", and "." are included as symbols that are markers. Also, these markers have been extracted for the first time. Accordingly, the candidate generation unit 11 sets the level of this line to "level of immediately-previous line+1". Specifically, since there is no immediately-previous line, the candidate generation unit 11 sets the level of the first line to 1.

Next, the candidate generation unit 11 performs determination similar to that for the first line on the second line (L2) as well. In the second line, "■", "-masu", and "!" are included as symbols that are markers. Since these are also extracted for the first time, the candidate generation unit 11 sets the level of this line to "immediately-previous line+1" as well. Specifically, since the immediately-previous line is "1", the candidate generation unit 11 sets the level of the second line to 2.

Next, the candidate generation unit 11 performs determination similar to that for the first line on the third line (L3) as well. In the third line, "(2)", "desu", and "!" are included as symbols that are markers. Among these, "(2)" is in the same symbol class as "(1)" in the first line, and "!" is included in the second line as well. Accordingly, the candidate generation unit 11 sets level 1, which is the same as that of the first line, and level 2, which is the same as that of the second line, for the third line.

Furthermore, the candidate generation unit 11 performs determination similar to that for the first line on a fourth line (L4) and a fifth line (L5) as well. As a result, the candidate generation unit 11 sets level 1, which is the same as that of the first line, and level 2, which is the same as that of the second line, for both the fourth line and the fifth line.

According to the above-described processing, the candidate generation unit 11 generates eight candidates as shown in FIG. 5 for the document A by combining all of the levels set for the respective lines.

The candidate evaluation unit 12 performs evaluation on each of the multiple obtained candidates for the hierarchical structure for each document included in the set of documents, and selects one of the candidates as the hierarchical structure of that document based on the evaluation result.

Specifically, the candidate evaluation unit 12 calculates an intra-document index for each candidate for the hierarchical structure, and performs evaluation of that candidate based on the calculated intra-document index. Also, for example, the intra-document index is calculated by adding together the hierarchical smoothness calculated using Formula 1 below and the intra-level similarity calculated using Formula 2 below (Formula 3). Also, in Formula 1 below, 1 indicates the line count in the document ($1 \leq l \leq L$). In Formula 2 below, m indicates the number of line pairs determined to be in a parallel relationship ($1 \leq m \leq K$).

$$\text{Hierarchical smoothness} = -\Sigma(l \text{ in } 2 \ldots L)|\text{level\_}l - \text{level\_}(l-1)| \quad \text{[Formula 1]}$$

$$\text{Intra-level similarity} = \Sigma\_(m \text{ in } 1 \ldots K) \quad \text{[Formula 2]}$$

$$\text{Intra-document index} = \text{Hierarchical smoothness} + \text{intra-level similarity} \quad \text{[Formula 3]}$$

In Formula 3 above, the hierarchical smoothness S and the intra-level similarity A may also be respectively multiplied by pre-set weights. Also, in order to make the units of the hierarchical smoothness A the same, a value obtained by dividing the calculation value of Formula 2 above by the line count of the document may also be used as the intra-level similarity A. Also, the candidate evaluation unit 12 selects the candidate with the highest value of the intra-document index as the hierarchical structure of the document.

The consistency evaluation unit 13 obtains the ranking order in the document set for the markers used to generate the hierarchical structures of the multiple documents. Also, for each of the multiple documents, the consistency evaluation unit 13 evaluates the consistency of the hierarchical structure selected for that document with a hierarchical structure selected in another document based on the ranking order of the markers present in that document.

Specifically, for each symbol class of the extracted markers, the consistency evaluation unit 13 obtains the sum of the levels of the lines from which markers were extracted, furthermore divides the sum by the number of lines from which markers belonging to that symbol class were extracted, and uses the obtained value as the average score. Then, the consistency evaluation unit 13 sets the ranking order for the markers for each symbol class such that the smaller the average score is, the higher the ranking is.

For example, if (1), (2), (3), and (4), which belong to the same symbol class, have been extracted and the level of the line from which they were extracted is 1, the average score of these markers is 1.25 (=(1+1+1+1)/4).

Next, the consistency evaluation unit 13 applies the set ranking order to Formulas 4 and 5 below to evaluate the above-described consistency, and therefore calculates a consistency index indicating the consistency of the selected hierarchical structure with the hierarchical structure selected in another document.

$$\text{Consistency index} = |\text{Level of line from which marker was extracted} - \text{ranking order of marker}| \quad \text{[Formula 4]}$$

$$\text{Consistency index} = (\text{Level of line from which marker was extracted} - \text{ranking order of marker})^2 \quad \text{[Formula 5]}$$

Upon calculating the consistency index for each document, the consistency evaluation unit 13 compares each calculated consistency index and a threshold value. Then, the consistency evaluation unit 13 determines that the selected hierarchical structure is not consistent in the document set for a document for which the consistency index falls below the threshold. Also, the consistency evaluation unit 13 outputs the determination result to an external terminal device 20. Also, when the evaluation is performed by the consistency evaluation unit 13 in this manner, it is possible to determine the superiority or inferiority of candidates for which the intra-document indices are the same.

[Apparatus Operations]

Figure 6:
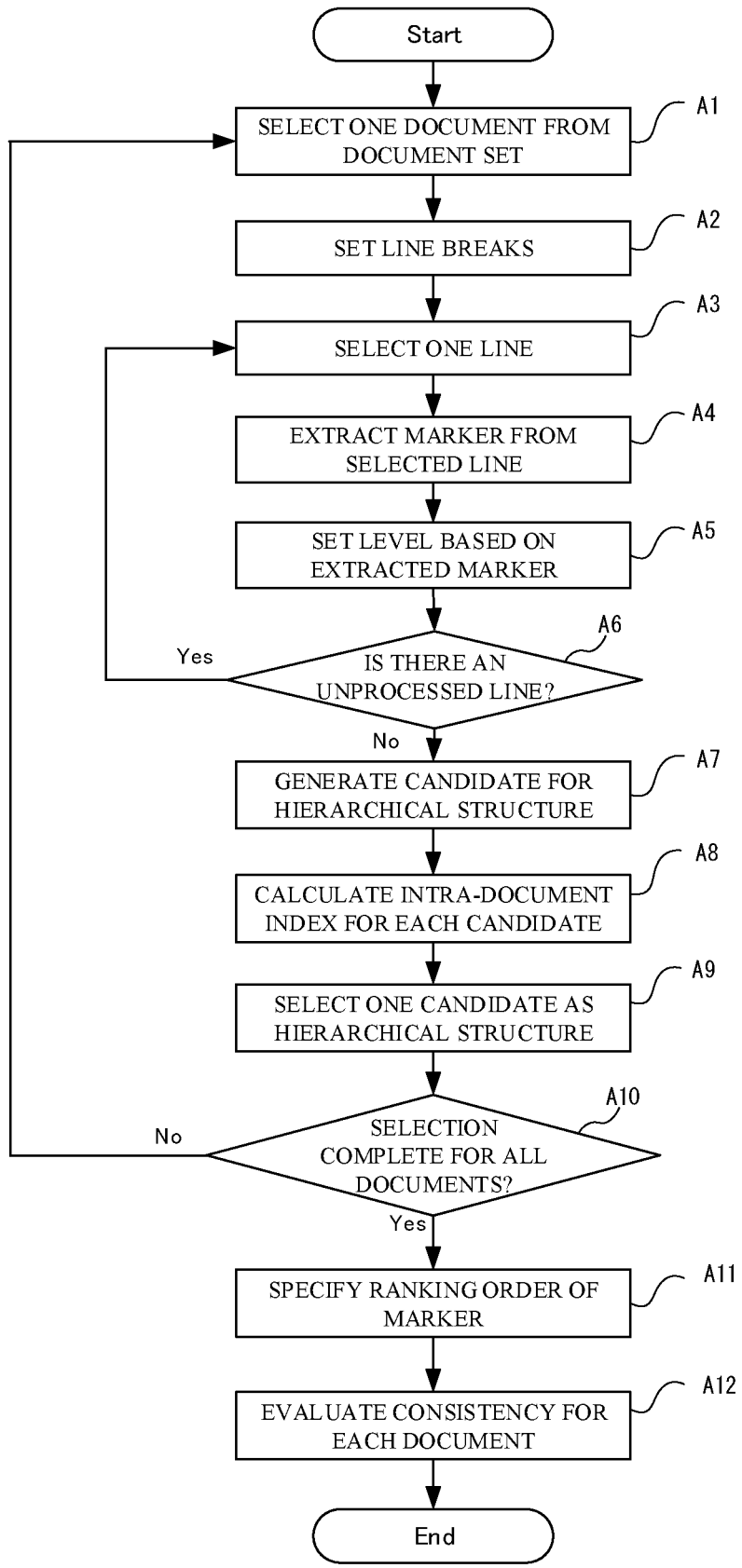
FIG. 6 is a flowchart showing operations of a document analysis apparatus according to an example embodiment of the present invention.

Next, operations of the document analysis apparatus 10 according to an example embodiment of the present invention will be described with reference to FIG. 6. FIG. 6 is a flowchart showing operations of a document analysis apparatus according to an example embodiment of the present invention. In the following description, FIGS. 1 to 5 will be referenced as needed. Also, in the present example embodiment, a document analysis method is carried out by causing the document analysis apparatus to operate. Accordingly, the description of the document analysis method according to the present example embodiment is used instead of a description of the operations of the document analysis apparatus 10 below.

As shown in FIG. 6, the candidate generation unit 11 first selects one document out of a document set that is the analysis target (step A1). Next, the candidate generation unit 11 sets line breaks in accordance with a pre-set rule in the document selected in step A1 (step A2).

Next, the candidate generation unit 11 selects one line in the document selected in step A1 (step A3). Next, the candidate generation unit 11 executes extraction of markers (see FIG. 4) in the selected line (step A4).

Next, the candidate generation unit 11 sets the level for the line selected in step A3 based on the markers extracted in step A4 (step A5).

Specifically, if the line selected in step A3 is the first line, and if the extracted markers have not yet been extracted, the candidate generation unit 11 sets the level of the target line to "immediately-previous line+1". In contrast to this, if the extracted markers have already been extracted in a previous line, the candidate generation unit 11 sets the level of the target line to the level of the line from which the markers were previously extracted.

Also, if there are multiple markers that were extracted in step A4, the candidate generation unit 11 determines whether or not each marker has been extracted yet. In this case, according to the determination result, multiple levels are set for the target line in some cases.

Next, the candidate generation unit 11 determines whether or not there is a line for which the processing of steps A3 to A5 has not ended (step A6). When the processing of steps A3 to A5 ends for all of the lines, one candidate for the hierarchical structure has been generated. If it is determined in step A6 that there is a line for which processing has not ended, the candidate generation unit 11 executes step A3 again.

If it is determined in step A6 that there is no line for which the processing has not ended, the candidate generation unit 11 generates candidates for the hierarchical structure for the document selected in step A1 based on the levels set for each line (step A7). Specifically, the candidate generation unit 11 generates two or more candidates as shown in FIG. 5 by combining all of the levels set for the lines.

Note that in the example shown in FIG. 6, candidates for the hierarchical structure are generated while reading one line at a time in steps A3 to A7, but in the present example embodiment, there is no limitation to this example. The present example embodiment may be a mode in which, for example, all lines are read while specifying a parallel relationship, and thereafter the candidates for the hierarchical structure are generated.

Next, when step A6 ends, the candidate evaluation unit 12 calculates the intra-document index for each generated candidate for the hierarchical structure for the document selected in step A1 (step A8).

Next, based on the intra-document indices for the candidates for the hierarchical structure, the candidate evaluation unit 12 selects the candidate for which the value of the intra-document index is the highest as the hierarchical structure of the document selected in step A1 (step A9).

Next, the candidate evaluation unit 12 determines whether or not the hierarchical structures have been selected for all of the documents included in the document set being analyzed (step A10). If is determined in step A10 that the hierarchical structures have not been selected for all of the documents, the candidate evaluation unit 12 causes the candidate generation unit 11 to execute step A1 once again.

If it is determined in step A10 that the hierarchical structures have been selected for all of the documents, the candidate evaluation unit 12 notifies the consistency evaluation unit 13 of this fact. Accordingly, the consistency evaluation unit 13 obtains the ranking orders in the document set for the markers used in the generation of the hierarchical structures of the documents (step A11).

Next, for each document, based on the ranking orders of the markers that are present in the document, the consistency evaluation unit 13 evaluates the consistency of the hierarchical structure selected for the document with a hierarchical structure selected in another document (step A12).

Specifically, in step A12, upon calculating the consistency index for each document, the consistency evaluation unit 13 compares each calculated consistency index and a threshold. Then, the consistency evaluation unit 13 determines that the selected hierarchical structure is not consistent in the document set for a document for which the consistency index falls below the threshold. Also, the consistency evaluation unit 13 transmits the determination result to the terminal device 20 of a user. This makes it possible for the user to check the determination result via a screen of the terminal device 20.

[Specific example]

Next, a specific example of the present example embodiment will be described with reference to FIGS. 7A and 7B. FIG. 7A is a diagram showing an example of a target document, and FIG. 7B is a diagram showing an example of a hierarchical structure obtained from the document shown in FIG. 7A.

When the document shown in FIG. 7A is input, the candidate generation unit 11 extracts "(", "valuable item", "symbol", "mail", and "PostalCode" as markers from the lines. Then, the candidate generation unit 11 generates candidates for the hierarchical structure using the extracted markers.

The candidate evaluation unit 12 calculates intra-document indices for multiple candidates. Thereafter, as shown in FIG. 7B one candidate is selected based on the calculated intra-document index.

Effect of the Example Embodiment

In this manner, in the present example embodiment, even if a document has no hierarchy, markers indicating the hierarchy are extracted to generate candidates for a hierarchical structure, and from among these, a suitable hierarchical structure is selected. For this reason, according to the present example embodiment, even if a document has no hierarchy, it is possible to extract a hierarchical structure. Also, in the present example embodiment, if a target is a document set, the consistency of a hierarchical structure of each document with a hierarchical structure of another document is evaluated, and therefore it is possible to extract a more suitable hierarchical structure.

[Program]

A program according to the present example embodiment need only be a program for causing a computer to execute steps A1 to A14 shown in FIG. 6. The document analysis apparatus 10 and the document analysis method according to the present example embodiment can be realized by installing this program in a computer and executing the program. In this case, a processor of the computer functions as the candidate generation unit 11, the candidate evaluation unit 12, and the consistency evaluation unit 13 and performs processing.

Also, the program according to the present example embodiment may also be executed by a computer system constructed by multiple computers. In this case, for example, each computer may function as one of the candidate generation unit 11, the candidate evaluation unit 12, and the consistency evaluation unit 13.

Figure 8:
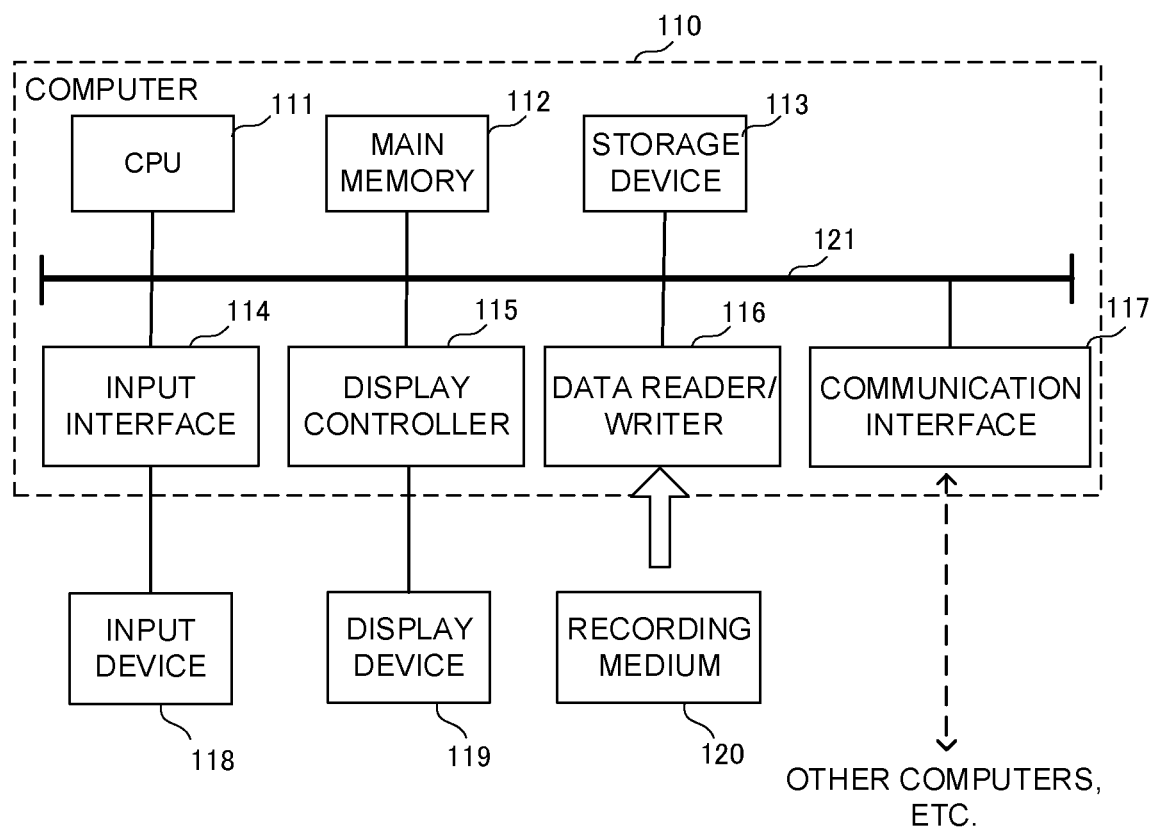
FIG. 8 is a block diagram showing an example of a computer for realizing a document analysis apparatus according to an example embodiment of the present invention.

Here, a computer that realizes the document analysis apparatus 10 by executing the program according to the present example embodiment will be described with reference to FIG. 8. FIG. 8 is a block diagram showing an example of a computer for realizing a document analysis apparatus according to an example embodiment of the present invention.

As shown in FIG. 8, the computer 110 includes a CPU (Central Processing Unit) 111, a main memory 112, a storage device 113, an input interface 114, a display controller 115, a data reader/writer 116, and a communication interface 117. These units are connected via a bus 121 so as to be able to perform data communication with each other. Also, the computer 110 may include a GPU (Graphics Processing Unit) or an FPGA (Field-Programmable Gate Array) in addition to or instead of the CPU 111.

The CPU 111 carries out various types of computation by expanding the program (code) according to the present example embodiment, which is stored in the storage device 113, to the main memory 112, and executing the program in a predetermined sequence. The main memory 112 is typically a volatile storage device such as a DRAM (Dynamic Random Access Memory). Also, the program according to the present example embodiment is provided in a state of being stored in a computer-readable recording medium 120. Note that the program according to the present example embodiment may also be distributed on the Internet, which is connected to via a communication interface 117.

Also, specific examples of the storage device 113 include a hard disk drive as well as a semiconductor storage device such as a flash memory. The input interface 114 mediates data transmission between the CPU 111 and input devices 118 such as a keyboard and a mouse. The display controller 115 is connected to a display device 119 and controls display on the display device 119.

The data reader/writer 116 mediates data transmission between the CPU 111 and the recording medium 120 and executes reading of the program from the recording medium 120 and writing of the processing result of the computer 110 in the recording medium 120. The communication interface 117 mediates data transmission between the CPU 111 and another computer.

Also, specific examples of the recording medium 120 include a general-purpose semiconductor storage device such as a CF (Compact Flash (registered trademark)) and an SD (Secure Digital), a magnetic recording medium such as a flexible disk, or an optical recording medium such as a CD-ROM (Compact Disk Read Only Memory).

Note that the document analysis apparatus 10 according to the present example embodiment can be realized by using hardware corresponding to the units instead of the computer in which the program is installed. Furthermore, a portion of the document analysis apparatus 10 may be realized by a program and the remaining portion may be realized by hardware.

A portion or all of the above-described example embodiments can be realized by (Supplementary note 1) to (Supplementary note 12) described hereinafter, but there is no limitation to the following description.

(Supplementary Note 1)

A document analysis apparatus comprising:

a candidate generation unit configured to, for each line included in a document that is a target of structural analysis, specify another line in a parallel relationship with the line by extracting a marker indicating a hierarchy, and generate a candidate for a hierarchical structure of the document that is the target based on the result of specification for each line; and a candidate evaluation unit configured to, if two or more candidates have been generated, perform evaluation on each candidate for the hierarchical structure, and select one candidate for the hierarchical structure as the hierarchical structure of the document that is the target, based on the evaluation result.

(Supplementary Note 2)

The document analysis apparatus according to supplementary note 1, wherein if the target of the structural analysis is a document set constituted by a plurality of documents, the candidate generation unit generates the candidate for each document constituting the document set, for each document constituting the document set, the candidate evaluation unit selects one candidate as the hierarchical structure of the document, and the document analysis apparatus further includes a consistency evaluation unit configured to obtain a ranking order in the document set for the marker used to generate the hierarchical structure of each of the plurality of documents, and evaluate, for each of the plurality of documents, consistency of the hierarchical structure selected for the document with a hierarchical structure selected for another document, based on the ranking order of the marker that is present in the document.

(Supplementary Note 3)

The document analysis apparatus according to supplementary note 1 or 2, wherein for each line, the candidate generation unit performs extraction of a symbol included in the line as the marker, and specifies another line including a symbol that is the same as or similar to the extracted symbol as the other line in a parallel relationship with the line.

(Supplementary note 4)

The document analysis apparatus according to any one of supplementary notes 1 to 3, wherein the candidate generation unit generates a plurality of lines by setting a line break in the document that is the target in accordance with a pre-set rule, and specifies the other line in a parallel relationship with the line by performing extraction of the marker for each generated line.

(Supplementary note 5)

A document analysis method comprising:

(a) a step of specifying, for each line included in a document that is a target of structural analysis, another line in a parallel relationship with the line by extracting a marker indicating a hierarchy, and generating a candidate for a hierarchical structure of the document that is the target based on the result of specification for each line; and (b) a step of performing evaluation on each candidate for the hierarchical structure if two or more candidates have been generated, and selecting one candidate for the hierarchical structure as the hierarchical structure of the document that is the target, based on the evaluation result.

(Supplementary note 6)

The document analysis method according to supplementary note 5, wherein if the target of the structural analysis is a document set constituted by a plurality of documents, in the (a) step, the candidate is generated for each document constituting the document set, in the (b) step, for each document constituting the document set, one candidate is selected as the hierarchical structure of the document, and the document analysis method further includes (c) a step of obtaining a ranking order in the document set for the marker used to generate the hierarchical structure of each of the plurality of documents, and evaluating, for each of the plurality of documents, consistency of the hierarchical structure selected for the document with a hierarchical structure selected in another document, based on the ranking order of the marker that is present in the document.

(Supplementary note 7)

The document analysis method according to supplementary note 5 or 6, wherein in the (a) step, for each line, a symbol included in the line is extracted as a marker, and another line including a symbol that is the same as or similar to the extracted symbol is specified as the other line in a parallel relationship with the line.

(Supplementary note 8)

The document analysis method according to any one of supplementary notes 5 to 7, wherein in the (a) step, a plurality of lines are generated by setting a line break in the document that is the target in accordance with a pre-set rule, and for each generated line, another line in a parallel relationship with the line is specified by performing extraction of the marker.

(Supplementary note 9)

A computer-readable recording medium on which is recorded a program including a command for causing a computer to execute:

(a) a step of specifying, for each line included in a document that is a target of structural analysis, another line in a parallel relationship with the line by extracting a marker indicating a hierarchy, and generating a candidate for a hierarchical structure of the document that is the target based on the result of specification for each line; and (b) a step of performing evaluation on each candidate for the hierarchical structure if two or more candidates have been generated, and selecting one candidate for the hierarchical structure as the hierarchical structure of the document that is the target based on the evaluation result.

(Supplementary note 10)

A computer-readable storage medium according to supplementary note 9, wherein if the target of the structural analysis is a document set constituted by a plurality of documents, in the (a) step, the candidate is generated for each document constituting the document set, in the (b) step, for each document constituting the document set, one candidate is selected as the hierarchical structure of the document, and the program further includes a command for causing the computer to execute (c) a step of obtaining a ranking order in the document set for the marker used to generate the hierarchical structure for each of the plurality of documents, and evaluating, for each of the plurality of documents, consistency of the hierarchical structure selected for the document with a hierarchical structure selected in another document, based on the ranking order of the marker that is present in the document.

(Supplementary note 11)

The computer-readable storage medium according to supplementary note 9 or 10, wherein in the (a) step, for each line, a symbol included in the line is extracted as the marker, and another line including a symbol that is the same as or similar to the extracted symbol is specified as the other line in a parallel relationship with the line.

(Supplementary note 12)

The computer-readable storage medium according to any one of supplementary notes 9 toll, wherein in the (a) step, a plurality of lines are generated by setting a line break in the document that is the target in accordance with a pre-set rule, and for each generated line, another line in a parallel relationship with the line is specified by performing extraction of the marker.

Although the invention of the present application has been described above with reference to an example embodiment, the invention of the present application is not limited to the above-described example embodiment. The configuration and details of the invention of the present application can be subjected to various modifications that can be understood by a person skilled in the art within the scope of the invention of the present application.

INDUSTRIAL APPLICABILITY

As described above, according to the present invention, it is possible to extract a hierarchical structure even if a document has no hierarchy. The present invention is useful in various fields in which effective use of documents is required.

LIST OF REFERENCE SIGNS

10 Document analysis apparatus
11 Candidate generation unit
12 Candidate evaluation unit 13 Consistency evaluation unit
20 Terminal device of user
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A document analysis apparatus comprising:
a processor;
a memory storing code executable by the processor to:
for each line of a plurality of lines included in each document of a plurality of documents of a document set that is a target of structural analysis, specify another line of the plurality of lines in a parallel relationship with the line by extracting a marker indicating a hierarchy, and generate a candidate for a hierarchical structure of the document set that is the target based on a result of specifying the another line in the parallel relationship with the line;
in response to two or more candidates having been generated based on the result, perform evaluation on each candidate of the candidates for the hierarchical structure, and select one of the candidates for the hierarchical structure as the hierarchical structure of the document set that is the target, based on a result of evaluation performed on each candidate;
for each document of the plurality of documents, extract a plurality of markers for the plurality of lines, calculate a sum of levels of the lines for each of a plurality of symbol classes of the extracted markers, and calculate an average score based on the sum;
for each document of the plurality of documents, set a ranking order for the markers of each symbol class such that a smaller the average score is, a higher a ranking of the markers in the ranking order; and
evaluate, for each document of the plurality of documents, consistency of the hierarchical structure selected for the document set with a hierarchical structure for the document set selected for another document of the plurality of documents, based on the ranking order for the markers in the evaluated document.

2. The document analysis apparatus according to claim 1, wherein the code is executable by the processor to further, for each line, perform extraction of a symbol included in the line as the marker, and specify another line of the plurality of lines including a symbol that is the same as or similar to the extracted symbol as the another line of the plurality of lines in the parallel relationship with the line.

3. The document analysis apparatus according to claim 1, wherein the code is executable by the processor to, for each document of the plurality of documents, further generate the plurality of lines by setting a line break in the document in accordance with a pre-set rule, and specify the another line of the plurality of lines that is in a parallel relationship with the line by performing extraction of the marker for each generated line.

4. A document analysis method comprising:
specifying, for each line of a plurality of lines included in each document of a plurality of documents of a document set that is a target of structural analysis, another line of the plurality of lines in a parallel relationship with the line by extracting a marker indicating a hierarchy, and generating a candidate for a hierarchical structure of the document set that is the target based on a result of specifying the another line in the parallel relationship with the line;
in response to two or more candidates having been generated based on the result, performing evaluation on each candidate of the candidates for the hierarchical structure, and selecting one of the candidates for the hierarchical structure as the hierarchical structure of the document set that is the target, based on a result of evaluation performed on each candidate;
for each document of the plurality of documents, extracting a plurality of markers for the plurality of lines, calculating a sum of levels of the lines for each of a plurality of symbol classes of the extracted markers, and calculating an average score based on the sum;
for each document of the plurality of documents, setting a ranking order for the markers of each symbol class such that a smaller the average score is, a higher a ranking of the markers in the ranking order; and
evaluating, for each document of the plurality of documents, consistency of the hierarchical structure selected for the document set with a hierarchical structure for the document set selected for another document of the plurality of documents, based on the ranking order for the markers in the evaluated document.

5. The document analysis method according to claim 4, wherein in the specifying, for each line, a symbol included in the line is extracted as a marker, and another line of the plurality of lines including a symbol that is the same as or similar to the extracted symbol is specified as the another line of the plurality of lines in the parallel relationship with the line.

6. The document analysis method according to claim 4, wherein in the specifying, the plurality of lines for each document of the plurality of documents are generated by setting a line break in the document in accordance with a pre-set rule, and for each generated line, the another line of the plurality of lines that is in the parallel relationship with the line is specified by performing extraction of the marker.

7. A non-transitory computer-readable recording medium on which is recorded a program including a command for causing a computer to execute:
specifying, for each line of a plurality of lines included in each document of a plurality of documents of a document set that is a target of structural analysis, another line of the plurality of lines in a parallel relationship with the line by extracting a marker indicating a hierarchy, and generating a candidate for a hierarchical structure of the document set that is the target based on a result of specifying the another line in the parallel relationship with the line;
in response to two or more candidates having been generated based on the result, performing evaluation of the candidates on each candidate for the hierarchical structure, and selecting one of the candidates for the hierarchical structure as the hierarchical structure of the document set that is the target, based on a result of evaluation performed on each candidate;

for each document of the plurality of documents, extracting a plurality of markers for the plurality of lines, calculating a sum of levels of the lines for each of a plurality of symbol classes of the extracted markers, and calculating an average score based on the sum;

for each document of the plurality of documents, setting a ranking order for the markers of each symbol class such that a smaller the average score is, a higher a ranking of the markers in the ranking order; and evaluating, for each document of the plurality of documents, consistency of the hierarchical structure selected for the document set with a hierarchical structure for the document set selected for another document of the plurality of documents, based on the ranking order for the markers in the evaluated document.

8. The non-transitory computer-readable recording medium according to claim 7, wherein in the specifying, for each line, a symbol included in the line is extracted as a marker, and another line of the plurality of lines including a symbol that is the same as or similar to the extracted symbol is specified as the another line of the plurality of lines in the parallel relationship with the line.

9. The non-transitory computer-readable recording medium according to claim 7, wherein in the specifying, the plurality of lines for each document of a plurality of documents are generated by setting a line break in the document in accordance with a pre-set rule, and for each generated line, the another line of the plurality of lines that is in the parallel relationship with the line is specified by performing extraction of the marker.

\* \* \* \* \*